United States Patent [19]

Kimura et al.

[11] Patent Number: 5,618,911
[45] Date of Patent: Apr. 8, 1997

[54] POLYMER CONTAINING LACTIC ACID AS ITS CONSTITUTING UNIT AND METHOD FOR PRODUCING THE SAME

[75] Inventors: Kunio Kimura; Takeshi Ito; Tomohiro Aoyama; Keiichi Uno; Kiyoshi Hotta; Minako Arichi, all of Ohtsu, Japan

[73] Assignee: Toyo Boseki Kabushiki Kaisha, Osaka, Japan

[21] Appl. No.: 285,552

[22] Filed: Aug. 3, 1994

[30] Foreign Application Priority Data

Aug. 19, 1993 [JP] Japan .................... 5-205181
May 10, 1994 [JP] Japan .................... 6-096550
May 23, 1994 [JP] Japan .................... 6-108505
May 24, 1994 [JP] Japan .................... 6-109791
May 26, 1994 [JP] Japan .................... 6-113013
May 17, 1994 [JP] Japan .................... 6-102496
Jun. 1, 1994 [JP] Japan .................... 6-120380

[51] Int. Cl.$^6$ .............................. C08G 63/08; C08F 6/00
[52] U.S. Cl. .......................... 528/361; 525/408; 525/411; 525/413; 525/415; 528/354; 528/480
[58] Field of Search ...................... 525/408, 411, 525/413, 415; 528/354, 361, 480

[56] References Cited

U.S. PATENT DOCUMENTS 5,484,882  1/1996  Takada ........................ 528/361

FOREIGN PATENT DOCUMENTS 63-165430  7/1988  Japan .
5-320323  12/1993  Japan .

OTHER PUBLICATIONS

Grijpma et al., "Polymerization Temperature Effects on the Properties of L–lactide and ε–caprolactone Copolymers", Polymer Bulletin 25, pp. 335–341 (1991).

Primary Examiner—Shelley A. Dodson
Attorney, Agent, or Firm—Foley & Lardner

[57] ABSTRACT

A polymer having a blocked terminal group according to the present invention, represented by the following Formula (I):

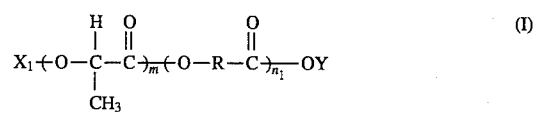

where R is an alkylene group containing 1 to 20 carbon atoms; $X_1$ is an acyl group containing 2 to 50 carbon atoms; Y is H, an alkyl group containing 1 to 50 carbon atoms or an alkenyl group containing 1 to 50 carbon atoms; m is a positive integer; and $n_1$ is 0 or a positive integer.

19 Claims, No Drawings

POLYMER CONTAINING LACTIC ACID AS ITS CONSTITUTING UNIT AND METHOD FOR PRODUCING THE SAME

BACKGROUND OF THE INVENTION

1. Field of the Invention

The present invention relates to biodegradable plastic and a method for producing the same, and more particularly, to a polymer containing lactic acid as its constituting unit and a method for producing the same. Furthermore, the present invention relates to a method for producing a cyclic diester used for the production of the polymer. 2. Description of the Related Art Nondegradable plastic waste causes environmental destruction. In recent years, biodegradable plastics have been extensively developed and studied. A biodegradable plastic may be decomposed by microorganisms, enzymes, or the like. Examples of biodegradable plastics include polyesters such as poly[(R)-3-hydoxybutylate] and polycaprolactone, and polyesters made of a glycol (e.g., ethylene glycol and 1,4-butanediol) and a carboxylic acid (e.g., succinic acid and adipic acid). However, since poly[(R)-3-hydroxybutylate] type polyesters are produced using a microorganism, they are expensive. Regarding the other polyesters, the use thereof is limited because of their low melting points.

Polylactic acid resin is used as a bioabsorbing material, such as a sutural thread for operations and a microcapsule for injections. Having superior biodegradability, the use of a polylactic resin for degradable plastic has been extensively developed. A polylactic resin has superior heat resistance and mechanical strength because of its high crystal melting point. Furthermore, after being decomposed, a polylactic resin hardly generates residues, ensuring the safety of any cleavage product.

However, polylactic acid has some disadvantages. That is, a polylactic acid is likely to be hydrolyzed and is unstable in water or an environment of high humidity. In addition, microorganisms slowly decompose polylactic acid.

Furthermore, polylactic acid has the following problems during melt molding. Polylactic acid becomes unstable when melted and decreases in molecular weight during melt molding. Thus, polylactic acid has poor molding stability and the physical properties of the resultant molding are decreased.

One of the reasons for instability of polylactic acid during melt molding is believed to result from a metal catalyst present in the polymer. In order to remove the metal catalyst, a method for inactivating the metal catalyst with a phosphorus compound, and a method for reprecipitating the polymer or washing the polymer with a solvent are known. However, according to the method for inactivating the metal catalyst with a phosphorus compound, the phosphorus compound is mixed with a molten polymer with high viscosity. Therefore, the efficiency is low. Furthermore, the phosphorus compound is harmful to the polymer and colors the polymer. According to the method for reprecipitating the polymer or washing the polymer with a solvent, complicated steps are required. Moreover, some of the solvent remains in the polymer.

In an attempt to solve the above-mentioned problems relative to polylactic acid, a copolymer containing lactic acid and a second component as its constituting unit has been developed (Polymer Bulletin, 25, 335, 1991, and Japanese Laid-Open Patent Publication No. 5-320323). However, copolymers simultaneously having stability during melt molding, hydrolysis resistance, and superior biodegradability have not been known.

A polyester of α-oxyacid, such as polylactic acid plastic, is generally synthesized by the ring opening polymerization of a diester, which is a cyclic dimer of α-oxyacid, by heating in the presence of a catalyst. This diester is usually prepared by polycondensing (dehydration condensation) α-oxyacid to give a precursor polymer, and depolymerizing the precursor polymer by heating. The diester thus prepared contains impurities inhibiting the ring opening polymerization, such as water, α-oxyacid, and an oligomer thereof. For this reason, a diester, which has been recrystallized several times, is used for the ring opening polymerization, thus increasing costs.

As an alternative method for preparing a diester, Japanese Laid-Open Patent Publication No. 63-165430 discloses a method for preparing a diester with high purity which includes the steps of: dissolving a diester in a hydrophobic organic solvent; extracting the diester with water in which a basic material is dissolved; and removing the organic solvent. However, this method is not sufficiently effective. Therefore, there has been a significant demand for a method for preparing an inexpensive diester.

SUMMARY OF THE INVENTION

The polymer having a blocked terminal group of the present invention is represented by the following Formula (I):

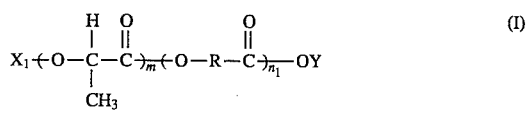

wherein R is an alkylene group containing 1 to 20 carbon atoms; $X_1$ is an acyl group containing 2 to 50 carbon atoms; Y is H, an alkyl group containing 1 to 50 carbon atoms or an alkenyl group containing 1 to 50 carbon atoms; m is a positive integer; and $n_1$ is 0 or a positive integer; wherein the polymer is at least one of a random polymer and a block polymer.

Alternatively, a polymer containing aluminum of the present invention is represented by the following Formula (II):

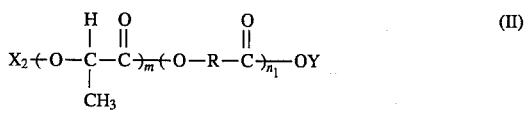

wherein R is an alkylene group containing 1 to 20 carbon atoms; $X_2$ is H, or an acyl group containing 2 to 50 carbon atoms; Y is H, an alkyl group containing 1 to 50 carbon atoms or an alkenyl group containing 1 to 50 carbon atoms; m is a positive integer; and $n_1$ is 0 or a positive integer; wherein the polymer is at least one of a random polymer and a block polymer, wherein, in a case where $X_2$ is H, the polymer has the following properties (a), (b), and (c):

(a) $IVF/IVi \geqq 0.85$ where IVf and IVi respectively represent reduced viscosity of the polymer after and before polymer is melted in an atmosphere of an inert gas at 200° C. for about one hour;

(b) $T_{10\%}$ (°C)$\geq$300 where $T_{10\%}$ represents a temperature at which 10% by weight of the polymer based on an initial weight thereof is reduced in a thermogravimetric analysis in which the polymer is heated at 10° C./minute in a stream of an inert gas; and (c) $1.00 \geq A/(a+B) \geq 0.95$ where A represents total absorption strength of the polymer in $^1$H-NMR, and B represents total absorption strength of monomers in $^1$H-NMR.

Alternatively, a block polymer of lactic acid of the present invention is represented by the following

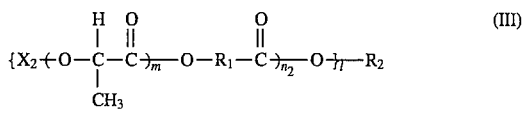

wherein $R_1$ is an aliphatic hydrocarbon group with 1 to 50 carbon atoms; $R_2$ is an aliphatic hydrocarbon group with 2 to 20 carbon atoms; $X_2$ is H or an acyl group with 2 to 50 carbon atoms; 1 is an integer of not less than one; m is a positive integer; and $n_2$ is a positive integer.

In one embodiment of the present invention, the above-mentioned polymer has a melting point of not less than 120° C., wherein m and $n_2$ satisfy the following Formula (IV):

$$0.6 \geq \frac{n_2}{m+n_2} \geq 1 \times 10^{-3} \quad (IV)$$

In another embodiment of the present invention, a weight of a polymer component having a number average molecular weight of not more than about 1000 is not more than 2% based on a total weight of the polymer.

According to another aspect of the present invention, a method for producing the above-mentioned polymer comprises the step of: ring opening polymerizing lactone in the presence of an aliphatic carboxylic acid containing 2 to 50 carbon atoms, wherein an amount of the aliphatic carboxylic acid is in the range of 0,001 to 5 mol % based on an amount of lactone.

Alternatively, a method for producing a cyclic diester used for the production of a polymer synthesized by ring opening polymerization and containing a structure represented by the following Formula (V) as its repeating unit, comprises the steps of:

polycondensing a corresponding α-oxyacid in the presence of at least one of a polyhydric alcohol having at least three hydroxyl groups and an alcohol ester of the corresponding α-oxyacid to obtain a precursor polymer having a carboxyl concentration of not more than 200 equivalents/$10^6$ g; and depolymerizing the precursor polymer by heating to obtain the cyclic diester;

wherein $R_3$ and $R_4$ are independently H or alkyl groups containing 1 to 5 carbon atoms.

In one embodiment of the present invention, the cyclic diester is a lactide, and the step of obtaining the precursor polymer and/or depolymerizing the precursor polymer is performed by using a metal compound catalyst having an electronegativity of metal ions of 10 to 15.

In another embodiment of the present invention, the metal compound catalyst is at least one catalyst selected from the group consisting of antimony trioxide, antimony acetate, and titanium tetrabutoxide.

Alternatively, a method for purifying a cyclic diester forming a polymer containing the structure represented by Formula (V) as its repeating unit prepared by ring opening polymerization, comprises the step of washing the cyclic diester containing impurities with an aqueous solvent:

In one embodiment of the present invention, the cyclic diester is selected from the group consisting of a lactide and a glycolide.

Thus, the invention described herein makes possible the advantages of (1) providing a stable polymer containing, as its constituting unit, lactic acid which is not made into a low-molecular-weight compound during melting because of blocked hydroxyl groups and carboxyl groups at the molecular terminals; (2) providing a stable polymer containing, as its constituting unit, lactic acid which is not made into a low-molecular-weight compound during melting because of the presence of aluminum; (3) providing a polymer containing lactic acid as its constituting unit, which is excellent in biodegradability and heat resistance by giving a highly blocked polymer; (4) providing an economical method for producing poly α-oxyacid, in which α-oxyacid is polycondensed in the presence of a polyhydric alcohol and/or an alcohol ester, and a diester (lactide) is synthesized by depolymerization of an oligomer with a low terminal carboxyl group concentration, so that the yield and purity of the lactide thus obtained is higher than those of conventional methods; and (5) providing an economical method excellent in purification yield for purifying lactide, in which a used washing solution can be recycled for polycondensation since an aqueous solvent is used for a washing step and which is easier to operate compared with a recrystallization method.

These and other advantages of the present invention will become apparent to those skilled in the art upon reading and understanding the following detailed description.

DESCRIPTION OF THE PREFERRED EMBODIMENTS

The term "polymer containing lactic acid as its constituting unit" refers to a polymer selected from the group consisting of: polylactic acid having L-lactic acid or D-lactic acid, or both; and a copolymer containing L-lactic acid or D-lactic acid, or both, and any second component as its constituting unit.

In the polymer according to the present invention, hydroxyl groups and/or carboxyl groups at its molecular termini can be preferably end-blocked.

Furthermore, the end-blocking groups can be aluminum, or the molecular termini can contain aluminum.

The term "end-blocked" means that hydroxyl groups and/or carboxyl groups at the molecular termini are blocked with saturated aliphatic hydrocarbon groups or unsaturated aliphatic hydrocarbon group containing 1 to 50 carbon atoms.

The polymer according to the present invention has hydroxyl groups and/or carboxyl groups at its molecular termini end-blocked so that the polymer is not decomposed during melt molding and thus maintains its stability. This stability can also be obtained when hydroxyl groups or carboxyl groups at the molecular termini are substantially blocked. Herein, the term "substantially blocked" means that about 70% or more of hydroxyl groups and/or carboxyl groups are blocked. For example, when 70% or more of the terminal hydroxyl groups are blocked with acyl groups having 2 to 50 carbon atoms, and/or 70% or more of the terminal carboxyl groups are blocked with alkyl groups or alkenyl groups, the polymer is not decomposed during melt molding and, as a result, maintains its stability. When about 80% or more of hydroxyl groups and/or carboxyl groups are blocked with acyl groups and alkyl groups or alkenyl groups, the polymer is even more stable against hydrolysis.

The degradability of the above-mentioned polymer can be controlled by selecting any second component. By highly blocking the polymer, the polymer can be provided with heat resistance and a melting point of 120° C. or more.

The polymer according to the present invention has a molecular weight of preferably about 3000 or more. In the above Formulae (I), (II), and (III), the preferred ranges of 1, m, $n_1$ and $n_2$ are 1 to 6, 20 to 20000, 0 to 10000, and 1 to 20000, respectively. In the polymer represented by the above Formulae (I) and (II), m and $n_1$ preferably satisfy the following relationship:

$$1.0 \geq \frac{m}{m+n_1} \geq 0.1$$

More preferably, the following relationship is satisfied:

$$1.0 \geq \frac{m}{m+n_1} \geq 0.5$$

In the polymer represented by the above Formula (III), m and $n_2$ preferably satisfy the following relationship:

$$0.6 \geq \frac{n_2}{m+n_2} \geq 1 \times 10^{-3}$$

The present invention also relates to a polymer containing lactic acid as its constituting unit. The weight of a component of the polymer with a number average molecular weight of about 70 to 1000 is 2% or less of the weight of the polymer.

Low molecular weight components having a number average molecular weight of about 70 to about 1000 such as unreacted lactide, lactone, lactic acid and oligomer of lactic acid accelerate the hydrolysis of polylactic acid. These low molecular weight components can be generally removed from a polymer by a reprecipitation method including the steps of dissolving the polymer in a solvent and adding another solvent which does not dissolve the polymer to the resultant mixture to precipitate the polymer; an extraction method using a solvent which dissolves only a low molecular weight compound; a method for treating resin under reduced pressure by heating; and the like.

The polymer according to the present invention can be synthesized by ring opening polymerizing lactone in the presence of an aliphatic carboxylic acid having 2 to 50 carbon atoms. Examples of the lactone include diesters of α-oxyacids, such as glycolic acid, lactic acid, and 2-hydroxyisobutyric acid. The D-form, L-form, or a racemic mixture of the α-oxyacids can be used. If required, two or more of the α-oxyacids can be combined.

When lactone is ring opening polymerized in the presence of an aliphatic carboxylic acid having 2 to 50 carbon atoms, terminal hydroxyl groups are blocked with acyl groups.

When lactone is ring opening polymerized in the presence of an aliphatic carboxylic acid, the molecular weight of a polymer to be obtained can be controlled. Alternatively, terminal hydroxyl groups can be blocked with acyl groups even by treating the obtained polymer with an aliphatic acid anhydride after ring opening polymerizing lactone.

Examples of the above-mentioned aliphatic carboxylic acid include acetic acid, propionic acid, burytic acid, valeric acid, caproic acid, capric acid, pelargonic acid, lauric acid, myristic acid, palmitic acid, stearic acid, arachidic acid, behenic acid, linoleic acid, oleic acid, succinic acid, adipic acid, suberic acid, azelaic acid, sebacic acid, undecanoic acid, dimer acid, and fumaric acid. Stearic acid, calcium stearate, palmitic acid, myristic acid, linoleic acid, oleic acid, fumaric acid, succinic acid, and adipic acid are preferably used. These acids are assured of safety as food additives. If required, acid anhydrides of these acids, or these acids and/or acid anhydrides thereof can be used in combination of two or more kinds thereof.

The amount of an aliphatic carboxylic acid to be used is preferably in the range of about 0,001 to about 5 mol %, more preferably in the range of about 0.001 to 1 mol % based on the amount of lactone. When the amount exceeds about 5 mol %, the molecular weight of a polymer to be obtained is decreased.

When the lactone is ring opening polymerized in the presence of a saturated or unsaturated aliphatic alcohol having 1 to 50 carbon atoms, the terminal carboxyl groups are blocked with alkyl groups or alkenyl groups.

Examples of the above-mentioned aliphatic alcohol include: monoalcohols such as methanol, ethanol, propanol, isopropanol, butanol, pentanol, nonanol, decanol, lauryl alcohol, myristyl alcohol, cetyl alcohol, stearyl alcohol, methyl lactate, ethyl lactate, and butyl lactate; dialcohols such as ethylene glycol, propanediol, butanediol, hexamethylene glycol, nonanediol, and tetramethylene glycol; and polyhydric alcohols such as glycerol, sorbitol, xylitol, ribitol, and erythritol. Long-chain alcohols such as decanol, lauryl alcohol, and myristyl alcohol are preferred. If required, these alcohols can be used in combination of two or more kinds thereof.

The amount of an aliphatic alcohol to be used is preferably in the range of about 0.001 to about 5 mol %, more preferably in the range of about 0.001 to about 1 mol % based on the amount of lactone. When the amount of aliphatic alcohol exceeds about 5 mol %, the molecular weight of a polymer to be obtained is decreased.

The above-mentioned ring opening polymerization is performed under pressure, if required. When the boiling points of an aliphatic acid and an aliphatic alcohol to be used are lower than the polymerization temperature, the ring opening polymerization is effectively performed.

For synthesizing the polymer according to the present invention, an oxyacid component containing an alkylene group having 1 to 20 carbon atoms can be used as the second constituting unit. Examples of the oxyacid component include cyclic lactones such as β-butyrolactone, γ-butyrolactone, ε-caprolactone, propiolactone, δ-valerolactone, 4-valerolactone, and glycolide. β-butyrolactone or ε-caprolactone are preferred. If required, these cyclic lactones can be used in combination of two or more kinds thereof. The above-mentioned aliphatic carboxylic acids and aliphatic alcohols are used with the corresponding lactone to effect ring opening polymerization, whereby a copolymer containing lactic acid as its constituting unit can be obtained.

The ring opening polymerization can be effected using a metal catalyst. For example, catalysts containing tin, antimony, zinc, titanium, iron, and aluminum can be used. Preferably, a catalyst containing tin is used. More preferably, tin actylate can be used.

The polymer of the present invention represented by the above Formula (II) and containing aluminum can be synthesized by using a catalyst containing aluminum. Preferably, a saturated or unsaturated carboxylic acid aluminum salt, or a β-diketone non-charged complex of aluminum having the following structure can be used:

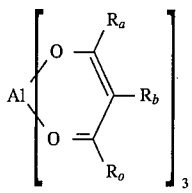

where $R_a$ and $R_b$ are independently an alkyl group, a cycloalkyl group, or an aryl group; $R_o$ is H, an alkyl group, a cycloalkyl group, or an aryl group; and the alkyl group, cycloalkyl group, or aryl group may contain a substituted halogen.

Examples of β-diketone coordinated to aluminum in the above formula include acetylacetone(2,4-pentanedione), propionylacetone, (2,4-hexanedione 2,4-heptanedione, 2,4-octanedione, 2,4 -decanedione, 3,5 -heptanedione, 2-methyl-3,5-heptanedione, 2,2-dimethyl-3,5-heptanedione, 2,6-dimethyl-3,5-heptanedione, pivaloylmethane (2,2,6,6-tetramethyl-3,5-heptanedione), benzoylacetone(1-phenyl-1, 3-butanedione), 1,3-diphenyl-1,3-propanedione, trifluoroacetylacetone(1,1,1-trifluoro-2,4-pentanedione), and hexafluoroacetylacetone(1,1,1,5,5,5-hexafluoro-2,4-pentanedione). Acetylacetone is preferred.

Examples of the above-mentioned saturated or unsaturated carboxylic acid aluminum salt include aluminum salts of acetic acid, propionic acid, butyric acid, valeric acid, caproic acid, capric acid, pelargonic acid, lauric acid, myristic acid, palmitic acid, stearic acid, linoleic acid, and oleic acid.

The amount of the aluminum compound catalyst used can be changed depending upon the desired purpose. The aluminum compound catalyst can be used in the range of 0.005 to 0.1 mol %, preferably in the range of 0.01 to 0.05 mol % based on the amount of lactone. When the amount of the aluminum compound catalyst used is less than 0.005 mol %, the polymerization speed is remarkably decreased. When the amount of the aluminum compound catalyst used exceeds 0.1 mol %, a polymer to be obtained loses heat stability and is likely to be colored.

The highly blocked polymer represented by the above Formula (III) can be synthesized by ring opening polymerizing lactone in accordance with the above procedure, using alcohols having an $R_2$ group as an initiator. Alternatively, the polymer can be produced by the steps of: polycondensing oxyacid having an $R_1$ group in the presence of alcohols having an $R_2$ group to obtain an oligomer having a hydroxyl group at its terminal represented by the following Formula (VI):

 (VI)

and adding lactide to the obtained oligomer so as to be ring opening polymerized.

Examples of the oxyacids having an $R_1$ group include cyclic lactones such as β-butyrolactone, γ-butyrolactone, ε-caprolactone, propiolactone, δ-valerolatctone, 4-valero-lactone, glycolide, and lactide; cyclic diesters such as 2-hydroxybutylic acid, 2-hydroxyisobutylic acid, 2-hydroxyvaleric acid, 2-hydroxyisovaleric acid, 2-hydroxy-2-methylbutylic acid, 2-hydroxycaproic acid, 2-hydroxyisocaproic acid, and 2-hydroxy-3-methyl-valeric acid; intermolecular cyclic diester of lactic acid and glycolic acid; and 3-methyl-2,5-diketo-1,4-dioxane (monomethylglycoide). β-butyrolactone or ε-caprolactone are preferred. If required, these oxyacids can be used in combination of two or more kinds.

The L-form, D-form, racemic mixture, and meso-form of the above-mentioned diester having asymmetric carbon atoms can be used.

A method for producing a cyclic diester used for the production of a polymer synthesized by ring opening polymerization and containing a structure represented by the following Formula (V), as its repeating unit, includes the steps of:

polycondensing a corresponding α-oxyacid in the presence of a polyhydric alcohol having at least three hydroxyl groups and/or alcohol ester of the corresponding α-oxyacid to obtain a precursor polymer having a carboxyl concentration of not more than 200 equivalents/$10^6$ g; and depolymerlzing the precursor polymer by heating to obtain the cyclic diester;

 (V)

wherein $R_3$ and $R_4$ are independently H or alkyl groups containing 1 to 5 carbon atoms.

Examples of the α-oxyacids include glycolic acid, lactic acid, and 2-hydroxyisobutylic acid. The D-form, L-form, and racemic mixture of these α-oxyacids can be used. If required, the α-oxyacids can be used in combination of two or more kinds thereof. Monomers and oligomers of these α-oxyacids can be used. These α-oxyacids can be used in the form of a solid, a liquid, or an aqueous solution.

Examples of the above-mentioned polyhydric alcohols include glycerine, substituted glycerine such as butane-1,2,3-triol, 3,7,11,15-tetramethyl-1,2,3-hexadecanetriol, and pentaerythritol. It is preferred that the polyhydric alcohol has a boiling point higher than that of the α-oxyacid to be used. For example, when lactide, which is obtained from lactic acid as the α-oxyacid, is used, glycerine, 3,7,11,15-tetramethyl- 1,2,3-hexadecanetriol, pentaerythritol, and the like can be used. Polyhydric alcohols can be used in the form of a solid, a liquid, or an aqueous solution. Aqueous polyhydric alcohols are preferred, since aqueous polyhydric alcohols can be easily removed with an aqueous solvent even when mixed with a cyclic diester of a product. The amount of the polyhydric alcohols used can be changed depending upon the desired purpose. In general, the amount of the polyhydric alcohols used is in the range of 1 to 20% by weight, preferably in the range of 2 to 10% by weight based on the weight of the α-oxyacid. When the amount used is less than 1% by weight, the reaction is prolonged. When the amount used exceeds 20% by weight, the purity of a cyclic diester to be obtained is decreased.

A precursor polymer having a carboxyl group concentration of not more than 200 equivalents/$10^6$ g can be obtained by the step of polycondensing the corresponding α-oxyacid in the presence of a polyhydric alcohol having at least 3 hydroxyl groups. The polycondensation is allowed to proceed preferably until the carboxyl group concentration becomes not more than 150 equivalents/$10^6$ g, more preferably until the carboxyl group concentration becomes not more than 100 equivalents/$10^6$ g.

During the above polycondensation, an αoxyacid is prevented from being distilled by appropriately adjusting the reaction temperature and the reaction pressure. In general, the reaction temperature and the reaction pressure are adjusted in the range of 150° to 200° C. under 5 to 50 mmHg, respectively. Preferably, in an initial stage, the reaction is effected in an atmosphere of an inert gas, such as nitrogen and argon, and then the reaction is allowed to proceed under reduced pressure.

In the step of depolymerizing the precursor polymer by heating to obtain a cyclic diester, the reaction temperature and reaction pressure can be adjusted depending upon the intended cyclic diester. In general, the reaction temperature and reaction pressure are in the range of 200° to 250° C. under 0.5 to 10 mmHg in this step.

The step of polycondensing the corresponding α-oxyacid in the presence of a polyhydric alcohol having at least 3 hydroxyl groups to obtain a precursor polymer having a carboxyl group concentration of not more than 200 equivalents/$10^6$ g is performed by using a known catalyst such as a metal compound and ion exchange resin. Examples of the catalysts include metal compounds containing metal ions, such as tin, titanium, antimony, germanium, and zinc. These catalysts can be used alone or in combination thereof.

Preferably, the above-mentioned polycondensation is effected using a metal compound catalyst having an electronegativity of metal ions of 10 to 15 so as to prevent the racemization of a reaction product. More preferably, antimony trioxide, antimony acetate, or titanium tetrabutoxide can be used.

The term "electronegativity" is defined by the following formula:

$$\text{Electronegativity of metal ions} = (1+(2 \times M)) \times N$$

where M is the charge of metal ions, and N is the electronegativity of elements calculated by the method of Pauling (J. Inorg. Nucl. Chem. 17, 215 (1961)). For example, antimony trioxide is made of trivalent antimony (M=3) and the electronegativity of antimony is 2.05, so that the electronegativity of metal ions is 14.4.

A metal compound catalyst having an electronegativity of not more than 10 is likely to racemize a reaction product and has a low reaction activity. A metal compound catalyst having an electronegativity of not less than 15 has a low reaction activity.

Antimony trioxide or antimony acetate does not cause racemization and hardly colors the obtained lactide.

The step of depolymerizing the precursor polymer by heating to obtain a cyclic diester can be performed using a catalyst used in the step of polycondensation. This step can be performed even using a catalyst different from that used in the step of polycondensation. For example, antimony trioxide or antimony acetate are used in the above-mentioned polycondensation step and titanium tetrabutoxide is used in the depolymerization step, whereby the depolymerization step can be promoted. In the case where titanium tetrabutoxide is used in the depolymerization step, the reaction time can be shortened by using a metal compound catalyst having an electronegativity outside of the range of 10 to 15, such as tin 2-ethylhexanate.

A method for purifying a cyclic diester forming a polymer containing the structure represented by the above-mentioned Formula (V) as its repeating unit prepared by ring opening polymerization, includes the step of washing the cyclic diester containing impurities with an aqueous solvent.

The above-mentioned washing step includes a step of adding an aqueous solvent to the obtained cyclic diester followed by stirring and recovering the cyclic diester. The cyclic diester can be recovered from a slurry of washing solution by mechanical means, such as filtration and centrifugation, followed by drying. If required, the resultant cyclic diester can be purified by recrystallization, sublimation purification, and distillation purification, or combinations thereof.

As the aqueous solvent, water or a mixture of water and any organic solvent capable of being easily mixed with water may be used. Examples of organic solvents include methanol, ethanol, propanol, isopropanol, butanol, ethylene glycol, acetonitrile, acetone, dioxane, and tetrahydrofuran. These aqueous solvents can be used alone or in combination of two ore more kinds thereof. Water or a water/isopropanol mixture is preferred. The mixture of water and the organic solvent contains at least 1% water, preferably at least 50% water, and more preferably at least 60% water. When the mixture contains not more than 1% water, the recovery of the cyclic diester is decreased.

In general, washing is performed at a temperature in the range of 15 to 40° C. At not more than 15° C., the removal ratio of impurities is decreased; and at not less than 40° C., the cyclic diester can be hydrolyzed.

The cyclic diester can be used in the form of a lump, particles, or powders. The form of fine powders is preferred. The cyclic diester obtained has substantially the same purity as that of the cyclic diester obtained by conventional recrystallization.

The steps of washing the cyclic diester with the aqueous solvent are performed by a batch wise or continuous process.

If required, additives such as pigments, antioxidants, age resistors, plasticizers, delustering agents, antistatic agents, and UV-absorbing agents can be added to the polymer of the present invention.

Furthermore, other polymers and/or minerals can be added to the polymer of the present invention. Examples of the polymers which may be added include polyolefin, polyester, polyamide, polyurethane, polyether, polyalkylene glycol, and natural polymers such as starch, denatured starch and cellulose. Examples of the minerals which may be added include talc, a molecular sieve, calcium carbonate, and potassium chloride.

By adjusting the amount of the additives and mixing amount of the mixture, the mechanical properties and degradability of the polymer to be obtained can be manipulated.

The polymer of the present invention can be molded by melting into a fiber, a film, a sheet, etc.

The fiber thus obtained can be used for a fishing line, a fishing net, nonwoven cloth for wrapping the root of a plant, nonwoven cloth for a seed bed, a multing material, and nonwoven cloth for farming and gardening such as a weeding sheet. The film and sheet thus obtained can be used for a film for wrapping, a multi-film for farming and gardening, a shopping bag, a garbage bag, tapes, a fertilizer bag, a separating film, etc. Furthermore, the film and sheet thus obtained can be used for beverage bottles and cosmetics; containers and dishes such as a disposable cup, a tray, a knife, a fork, and a spoon; a flower pot; a seed bed; a pipe which is not required to be dug; construction materials such as a provisionally fixing member; a carrier for control-releasing fertilizer; a coating of seeds, seedlings, and papers; paints; adhesives; ink, and the like.

Hereinafter, the present invention will be described by way of illustrative examples. The measurement of the characteristic values in the examples was subjected to the following methods.

(1) Reduced specific viscosity ($\eta_{SP}/C$)

To 100 ml of chloroform or mixed solvent of phenol and 2,4,6-trichlorophenyl (10:7 weight ratio), 0.5 g of polymer was dissolved. The resultant solution was measured for reduced specific viscosity at 25 ±0.1° C. and 30 ±0.1° C., respectively. The measurement was conducted using chloroform unless it is stated that the mixed solvent of phenol and 2,4,6-trichlorophenol was used.

(2) Melt stability test

A polymer, after being completely dried, was stirred in an atmosphere of nitrogen at 200° C. for one hour. The resultant polymer was measured for the change in reduced specific viscosity. From the obtained results, a viscosity maintaining ratio (VMR), when the polymer was melt, was calculated by the following formula:

$$VMR(\%) = \frac{\text{Reduced specific viscosity after treatment}}{\text{Reduced specific viscosity before treatment}} \times 100$$

(3) Thermogravimetry (temperature at which weight is reduced by 10%) (TGA)

Five milligrams of sample was analyzed for thermogravimetry with a heating rate of 10° C./minute in a stream of nitrogen, using TGA-50 manufactured by Shimadzu Corporation.

(4) Melting point (Tm)

Five milligrams of sample was measured for the melting point with a heating rate of 10° C./minute, using a DSC-50 manufactured by Shimadzu Corporation.

(5) Carboxyl group concentration (AV)

A sample was weighed and dissolved in a mixed solvent of chloroform and methanol (1:1 volume ratio). The resultant solution was measured for carboxyl group concentration by titration with sodium methoxide/methanol solution.

(6) Moisture content

In chloroform, 0.5 g of sample was dissolved. The resultant solution was measured for moisture content by using a digital micromoisture measurement device AQ-3C manufactured by Hiranuma Industrial Co., Ltd.

(7) Content of diester and its meso-form

One gram of diester was weighed and dissolved in acetonitrile. The resultant solution was measured for content of diester and its meso-form by using FIDGC (gas chromatograph GC-9A manufactured by Shimadzu Corporation). The results were expressed as % by weight. V-225 was used as a column, and nitrogen gas was used as carrier gas.

(8) Hydrolysis resistance test

A sample film having an about 0.5 mm thickness was soaked in a phosphate buffer, pH 7.0 at 90° C. for 12 hours. The weight and reduced specific viscosity of the sample before and after soaking was measured. From the obtained results, a weight retaining ratio (WR) and a viscosity retaining ratio (VR) were calculated by the following formulae:

$$WR(\%) = \frac{\text{Weight of sample film after soaking}}{\text{Weight of sample film before soaking}} \times 100$$

$$VR(\%) = \frac{\text{Viscosity of sample film after soaking}}{\text{Viscosity of sample film before soaking}} \times 100$$

(9) Weight of low molecular weight compound ($W_{low}$)

Two grams ($W_1$) of polymer sample were dissolved in 10 ml of chloroform, and then the solution was poured into 100 ml of methanol. After filtrating the precipitated polymer sample, the precipitated polymer was dried under reduced pressure at 50° C. for 24 hours to obtain a polymer. Form the weight ($W_2$) of the polymer thus obtained, the weight of low molecular weight compound ($W_{low}$) was measured by the following formula. The low molecular weight compound removed in the process was confirmed by a GPC method to have a number average molecular weight of 1000 or less.

$$W_{low}(\%) = \frac{W_1 - W_2}{W_1} \times 100$$

(10) Blockness ratio (B)

The blockness ratio was calculated by the following formula from the measurement results of an $^1$H-NMR.

$$B = \frac{\text{Content of lactic acid}}{\text{Chain length in a unit of lactic acid}} + \frac{\text{Content of lactone other than lactic acid}}{\text{chain length in a unit of lactone other than lactic acid}}$$

(11) Test for biodegradability

The biodegradability test was evaluated by a MITI method. According to the MITI method, the biodegradability was obtained as the amount of $CO_2$ generated by the decomposition of the microorganism in a standard activated sludge at 25° C.

(12) Measurement of an $^1$H-NMR spectrum

An $^1$H-NMR spectrum was measured with respect to a sample dissolved in chloroform having heavy hydrogen (d-chloroform) in order to increase the sensitivity of analysis.

EXAMPLE 1

In a polymerizing vessel equipped with a stirring device and an inlet and outlet tube for nitrogen were placed 20.0 g of L-lactide, 114 mg of stearic acid and a toluene solution of 6 mg of tin(I) octylate to obtain a mixture. The mixture was dried under reduced pressure for 2 hours and then heated to 200° C. under a slow stream of nitrogen to be ring opening polymerized. The reaction mixture immediately became viscous. After a one hour reaction was completed, the polymer was taken out from the polymerizing vessel.

The resultant polymer had a reduced specific viscosity of 1.70, a 10% weight reduction temperature of 321° C., and a melting point of 177° C. The polymer exhibited satisfactory melt stability (i.e., VMR=95%). The polymer was measured for an $^1$H-NMR spectrum using d-chloroform as a solvent. As a result, a peak (1.23 ppm) attributed to a terminal stearyl group was confirmed.

EXAMPLE 2

A polymer was obtained in the same way as in Example 1, except that 20.0 g of L-lactide and 228 mg of stearic acid were used.

The resultant polymer had a reduced specific viscosity of 0.84, a 10% weight reduction temperature of 310° C., and a melting point of 176° C. The polymer exhibited satisfactory melt stability (i.e., VMR=90%). The polymer was measured for an $^1$H-NMR spectrum using d-chloroform as a solvent. As a result, a peak attributed to a terminal stearyl group was confirmed.

EXAMPLE 3

A-polymer was obtained in the same way as in Example 1, except that 20.0 g of L-lactide and 28 mg of stearic acid were used.

The resultant polymer had a reduced specific viscosity of 1.77, a 10% weight reduction temperature of 315° C., and a melting point of 180° C. The polymer exhibited satisfactory melt stability (i.e., VMR=96%). The polymer was measured for an $^1$H-NMR spectrum using d-chloroform as a solvent. As a result, a peak attributed to a terminal stearyl group was confirmed.

EXAMPLE 4

A polymer was obtained in the same way as in Example 1, except that 20.0 g of n-lactide and 104 mg of palmitic acid were used.

The resultant polymer had a reduced specific viscosity of 1.74, a 10% weight reduction temperature of 319° C., and a melting point of 178° C. The polymer exhibited satisfactory melt stability (i.e., VMR=90%). The polymer was measured for an $^1$H-NMR spectrum using d-chloroform as a solvent. As a result, a peak attributed to a terminal palmityl group was confirmed.

EXAMPLE 5

A polymer was obtained in the same way as in Example 1, except that 20.0 g of L-lactide and 92 mg of myristic acid were used.

The resultant polymer had a reduced specific viscosity of 1.75, a 10% weight reduction temperature of 317° C., and a melting point of 178° C. The polymer exhibited satisfactory melt stability (i.e., VMR=89%). The polymer was measured for an $^1$H-NMR spectrum using d-chloroform as a solvent. As a result, a peak attributed to a terminal myristyl group was confirmed.

EXAMPLE 6

A polymer was obtained in the same way as in Example 1, except that 20.0 g of L-lactide and 86 mg of lauric acid were used.

The resultant polymer had a reduced specific viscosity of 1.735, a 10% weight reduction temperature of 317° C., and a melting point of 177° C. The polymer exhibited satisfactory melt stability (i.e., VMR=89%). The polymer was measured for an $^1$H-NMR spectrum using d-chloroform as a solvent. As a result, a peak attributed to a terminal lauryl group was confirmed.

EXAMPLE 7

A polymer was obtained in the same way as in Example 1, except that 20.0 g of L-lactide and 129 mg of oleic acid were used.

The resultant polymer had a reduced specific viscosity of 1.61, a 10% weight reduction temperature of 310° C., and a melting point of 174° C. The polymer exhibited satisfactory melt stability (i.e., VMR=89%). The polymer was measured for an $^1$H-NMR spectrum using d-chloroform as a solvent. As a result, a peak attributed to a terminal oleic acid residue was confirmed.

EXAMPLE 8

A polymer was obtained in the same way as in Example 1, except that 20.0 g of L-lactide and 30 mg of adipic acid were used.

The resultant polymer had a reduced specific viscosity of 1.68, a 10% weight reduction temperature of 307° C., and a melting point of 177° C. The polymer exhibited satisfactory melt stability (i.e., VMR=90%). The polymer was measured for an $^1$H-NMR spectrum using d-chloroform as a solvent. As a result, a peak attributed to a terminal adipic acid residue was confirmed.

EXAMPLE 9

A polymer was obtained in the same way as in Example 1, except that 20.0 g of glycolide and 114 mg of stearic acid were used.

The reduced specific viscosity of the resultant polymer was measured in a phenol/trichlorophenol solvent to be 1.10. The resultant polymer had a 10% weight reduction temperature of 335° C., and a melting point of 220° C. The polymer exhibited satisfactory melt stability (i.e., VMR=96%). The polymer was measured for an $^1$H-NMR spectrum using d-chloroform as a solvent. As a result, a peak attributed to a terminal stearyl group was confirmed.

EXAMPLE 10

In a polymerizing vessel equipped with a stirring device and an inlet and outlet tube for nitrogen were placed 20.0 g of L-lactide, 3.0 g of ε-caprolactone, 114 mg of stearic acid, and a toluene solution containing 6 mg of tin(I) octylate to obtain a mixture. The mixture was dried under reduced pressure for 2 hours and then heated to 200° C. in a stream of nitrogen to be ring opening polymerized. After a one and half hour reaction was completed, the polymer was taken out from the polymerizing vessel.

The resultant polymer had a reduced specific viscosity of 1.73, a 10% weight reduction temperature of 296° C., and a melting point of 131° C. The polymer exhibited satisfactory melt stability (i.e., VMR=83%). The polymer was measured for an $^1$H-NMR spectrum using d-chloroform as a solvent. As a result, a peak attributed to a terminal stearyl group was confirmed. In addition, the blockness ratio (B) of the polymer was 1.08.

EXAMPLE 11

In a polymerizing vessel equipped with a stirring device and an inlet and outlet tube for nitrogen were placed 20.0 g of L-lactide and a toluene solution containing 18 mg of aluminum acetyl acetonate to obtain a mixture. The mixture was dried under reduced pressure for 2 hours and then melt sealed under reduced pressure. The polymer was heated to 130° C. to be ring opening polymerized. After a 48 hour reaction was completed, the polymer was taken out from the polymerizing vessel.

The resultant polymer had a reduced specific viscosity of 6.31, a 10% weight reduction temperature of 338° C., and a melting point of 179° C. The polymer exhibited satisfactory melt stability (i.e., VMR=92%). The polymer was measured for an $^1$H-NMR spectrum, revealing that only 1.0% monomer was contained therein.

EXAMPLE 12

In a polymerizing vessel equipped with a stirring device and an inlet and outlet tube for nitrogen were placed 20.0 g of L-lactide, 58 mg of stearic acid, 32 mg of 1-decanole, and a toluene solution containing 6 mg of tin(I) octylate. The toluene solution was dried under reduced pressure for 2 hours and then heated to 200° C. in a stream of nitrogen to be ring opening polymerized. After a one and half hour reaction was completed, the polymer was taken out from the polymerizing vessel.

The resultant polymer had a reduced specific viscosity of 1.50, a 10% weight reduction temperature of 310° C., and a melting point of 175° C. The polymer exhibited satisfactory melt stability (i.e., VMR=95%). The polymer was measured for an $^1$H-NMR spectrum using d-chloroform as a solvent. As a result, a peak attributed to a terminal stearyl group and a decyl group was confirmed.

EXAMPLE 13

A polymer was obtained in the same way as in Example 1, except that 20.0 g of L-lactide, 132 mg of stearic acid, and 51 mg of 1,6-hexanediol were used.

The resultant polymer had a reduced specific viscosity of 1.48, a 10% weight reduction temperature of 317° C., and a melting point of 172° C. The polymer exhibited satisfactory melt stability (i.e., VMR=90%). The polymer was measured for an $^1$H-NMR spectrum using d-chloroform as a solvent. As a result, a peak attributed to a terminal stearyl group and a 1,6-hexanediol residue was confirmed.

EXAMPLE 14

A polymer was obtained in the same way as in Example 1, except that 20.0 g of L-lactide, 66 mg of myristic acid, and 59 mg of 1-myristyl alcohol were used.

The resultant polymer had a reduced specific viscosity of 1.54, a 10% weight reduction temperature of 309° C., and a melting point of 176° C. The polymer exhibited satisfactory melt stability (i.e., VMR=92%). The polymer was measured for an $^1$H-NMR spectrum using d-chloroform as a solvent. As a result, a peak attributed to a terminal myristyl group and a 1-myristyl alcohol residue was confirmed.

EXAMPLE 15

A polymer was obtained in the same way as in Example 1, except that 20.0 g of L-lactide, 76 mg of arachic acid, and 44 mg of sorbitol were used.

The resultant polymer had a reduced specific viscosity of 1.51, a 10% weight reduction temperature of 311° C., and a melting point of 176° C. The polymer exhibited satisfactory melt stability (i.e., VMR=89%). The polymer was measured for an $^1$H-NMR spectrum using d-chloroform as a solvent. As a result, a peak attributed to a terminal arachyl group and a sorbitol residue was confirmed.

EXAMPLE 16

In a polymerizing vessel equipped with a stirring device and an inlet and outlet tube for nitrogen were placed 20.0 g of L-lactide, 74 mg of lauryl alcohol, and a toluene solution containing 18 mg of aluminum acetyl acetonate to obtain a mixture. The mixture was dried under reduced pressure for 2 hours and then melt sealed under reduced pressure. The solution was heated to 150° C. to be ring opening polymerized. After a 10 hour reaction was completed, the polymer was taken out from the polymerizing vessel.

The resultant polymer had a reduced specific viscosity of 1.90, a 10% weight reduction temperature of 340° C., and a melting point of 177° C. The polymer exhibited satisfactory melt stability (i.e., VMR=95%). The polymer was measured for an $^1$H-NMR spectrum, revealing that only 0.9% monomer was contained therein.

Comparative Example 1

A polymer was obtained in the same way as in Example 1 with the following alterations: 20.0 g of L-lactide and 6 mg of tin(I) octylate were placed in the polymerizing vessel equipped with a stirring device and an inlet and outlet tube for nitrogen.

The resultant polymer had a reduced specific viscosity of 2.77, a 10% weight reduction temperature of 243° C., and a melting point of 181° C. The polymer exhibited unsatisfactory melt stability (i.e., VMR=62%).

Comparative Example 2

A polymer was obtained in the same way as in Example 11 with the following alterations: 20.0 g of L-lactide and 5 mg of tin(I) octylate were placed in the polymerizing vessel equipped with a stirring device and an inlet and outlet tube.

The resultant polymer had a reduced specific viscosity of 8.45, a 10% weight reduction temperature of 245° C., and a melting point of 181° C. The polymer exhibited unsatisfactory melt stability (i.e., VMR=57%).

Comparative Example 3

A polymer was obtained in the same way as in Comparative Example 1, except that 20.0 g of glycollide was polymerized. The reduced specific viscosity of the polymer was measured in a phenol/trichlorophenol solvent to be 1.55. The polymer had a 10% weight reduction temperature of 283° C. and a melting point of 225° C. The polymer exhibited unsatisfactory melt stability (i.e., VMR=55%).

EXAMPLE 17

ε-caprolactone was ring opening polymerized using ethylene glycol as an initiator to synthesize an oligomer with a number average molecular weight of 10000. Then, in a polymerizing vessel equipped with a stirring device and an inlet and outlet tube for nitrogen were placed 7.0 g of the oligomer together with 20.0 g of L-lactide, 114 mg of stearic acid, and a toluene solution containing 6 mg of tin(I) octylate. The mixture was dried in vacuo for 2 hours, subjected to nitrogen substitution, and then ring opening polymerized in a stream of nitrogen at 190° C. for one hour. Thereafter, the polymer thus obtained was dissolved in d-chloroform and then, the solution was poured into methanol, whereby the polymer was precipitated again to be purified. The polymer was dried under reduced pressure at 50° C. for 24 hours.

The resultant polymer had a reduced viscosity of 0.70 dL/g, a 10% weight reduction temperature of 280° C., and a melting point of 170° C. The polymer exhibited satisfactory melt stability (i.e., VMR=89%). The polymer was measured for an $^1$H-NMR. As a result, the polymer was confirmed to be a complete block copolymer and a peak attributed to a terminal stearyl group was confirmed. In addition, the polymer showed satisfactory biodegradability.

Five grams of the polymer obtained in Example 1 was dissolved in 30 ml of d-chloroform, and the solution was poured into 200 ml of methanol to deposit a polymer. The resultant polymer thus obtained was dried under reduced pressure at 50° C. for 24 hours.

The resultant polymer had a reduced viscosity of 1.87 dL/g and a weight of low molecular weight compound ($W_{low}$) of 0%. As shown in Table 1, the polymer exhibited satisfactory hydrolysis resistance.

EXAMPLE 19

Five grams of the polymer obtained in Example 1 was treated under reduced pressure of 0.1 mmHg at 100° C. for 12 hours, and then subjected to solid state treatment in a stream of nitrogen at 120° C. for hours.

The resultant polymer had a reduced viscosity of 1.72 dL/g and a weight of low molecular weight compound ($W_{low}$) of 0.9%. As shown in Table 1, the polymer exhibited satisfactory hydrolysis resistance.

EXAMPLE 20

Five grams of the polymer obtained in Example 10 was dissolved in 30 ml of d-chloroform, and the solution was poured into 200 ml of methanol to deposit a polymer. The resultant thus obtained was dried under reduced pressure at 50° C. for 24 hours.

The resultant polymer had a reduced viscosity of 1.90 dL/g and a weight of low molecular weight compound ($W_{low}$) of 0%. As shown in Table 1, the polymer exhibited satisfactory hydrolysis resistance.

EXAMPLE 21

Five grams of the polymer obtained in Example 10 was treated under reduced pressure of 0.1 mmHg at 100° C. for 12 hours, and then subjected to solid state treatment in a stream of nitrogen at 120° C. for hours.

The resultant polymer had a reduced viscosity of 1.71 dL/g and a weight of low molecular weight compound ($W_{low}$) of 1.3%. As shown in Table 1, the polymer exhibited satisfactory hydrolysis resistance.

EXAMPLE 22

The polymer obtained in Example 12 was treated in the same way as in Example 18.

The resultant polymer had a reduced viscosity of 1.62 dL/g and a weight of low molecular weight compound ($W_{low}$) of 0%. As shown in Table 1, the polymer exhibited satisfactory hydrolysis resistance.

EXAMPLE 23

The polymer obtained in Example 12 was treated in the same way as in Example 19.

The resultant polymer had a reduced viscosity of 1.53 dL/g and a weight of low molecular weight compound ($W_{low}$) of 0.9%. As shown in Table 1, the polymer exhibited satisfactory hydrolysis resistance.

Comparative Example 4

The polymer obtained in Example 1 was evaluated without being treated. The polymer had a weight of low molecular weight compound ($W_{low}$) of 6.2%. As shown in Table 1, the polymer exhibited unsatisfactory hydrolysis resistance.

TABLE 1

| Example | Hydrolysis resistance of polylactic acid | | |
|---|---|---|---|
| | $W_{low}$ (%) | WR (%) | VR (%) |
| Example 18 | 0.0 | 99.9 | 63.1 |
| Example 19 | 0.9 | 99.5 | 60.6 |
| Example 20 | 0.0 | 100.0 | 64.6 |
| Example 21 | 1.3 | 99.9 | 62.3 |
| Example 22 | 0.0 | 100.0 | 76.2 |
| Example 23 | 0.9 | 99.5 | 68.5 |
| Comparative Example 4 | 6.2 | 94.2 | 24.3 |
| Comparative Example 5 | 5.3 | 97.3 | 23.9 |

EXAMPLE 24

One hundred grams of L-lactic acid solution (90%), 3.4 g of glycerine, and 0.11 g of antimony trioxide were placed in a four-neck flask equipped with a stirring device and a nitrogen introducing tube. The mixture was heated with stirring to 180° C. over 1 hour under a slow stream of nitrogen to be concentrated by dehydration. Then, the resultant mixture was gradually depressurized to 5 mmHg over 1 hour, and then maintained under these conditions for 2 hours, whereby a precursor polymer was obtained. The polymer thus obtained was a pale yellow transparent solid and had a carboxyl group concentration (AV) of 64 equivalents/$10^6$ g. Then, the polymer was depolymerized at 210° C. under 1 mmHg for 1 hour to obtain 64 g of lactide.

EXAMPLE 25

One hundred grams of L-lactic acid aqueous solution (90%), 3.4 g of glycerine, and 0.24 g of antimony trioxide were placed in a four-neck flask equipped with a stirring device and an inlet and outlet tube for nitrogen. The mixture was heated with stirring to 180° C. over one hour under a slow stream of nitrogen to be concentrated by dehydration. Then, the resultant mixture was gradually depressurized to 5 mmHg over 1 hour, and then maintained under these conditions for 2 hours, whereby a precursor polymer was obtained. The polymer thus obtained was a pale yellow transparent solid and had a carboxyl group concentration (AV) of 118 equivalents/$10^6$g. Then, the polymer was depolymerized at 210° C. under 1 mmHg for 1 hour to obtain 62 g of lactide.

Comparative Example 6

One hundred grams of L-lactic acid solution (90%) and 0.10 g of antimony trioxide were placed in a four-neck flask equipped with a stirring device and a nitrogen introducing tube. The mixture was heated with stirring to 180° C. over 1 hour under a slow stream of nitrogen to be concentrated by dehydration. Then, the resultant mixture was gradually depressurized to 5 mmHg over 1 hour, and maintained under these conditions for 6 hours, whereby a precursor polymer was obtained. The polymer thus obtained was a pale yellow transparent solid and had a carboxyl group concentration (AV) of 516 equivalents/$10^6$g. Then, the polymer was depolymerized at 210° C. under 1 mmHg for 2 hours to obtain 38 g of lactide.

EXAMPLE 26

One hundred grams of L-lactic acid solution (90%), 3.4 g of glycerine, and 0.24 g of titanium tetrabutoxide were placed in a four-neck flask equipped with a stirring device and a nitrogen introducing tube. The mixture was heated with stirring to 180° C. over 1 hour under a slow stream of nitrogen to be concentrated by dehydration. Then, the resultant mixture was gradually depressurized to 5 mmHg over 1 hour, and was maintained under these conditions for 2 hours, whereby a precursor polymer was obtained. The polymer thus obtained was a reddish brown transparent solid and had a carboxyl group concentration (AV) of 60 equivalents/$10^6$ g. Then, the polymer was depolymerized at 210° C. under 1 mmHg for 30 minutes to obtain 62 g of lactide.

Comparative Example 7

One hundred grams of L-lactic acid solution (90%) and 0.24 g of titanium tetrabutoxide were placed in a four-neck flask equipped with a stirring device and an inlet and outlet tube. The mixture was heated with stirring to 180° C. over 1 hour under a slow stream of nitrogen to be concentrated by dehydration. Then, the resultant mixture was gradually depressurized to 5 mmHg over 1 hour, and was maintained under these conditions for 6 hours, whereby a precursor polymer was obtained. The polymer thus obtained was a reddish brown transparent solid and had a carboxyl concentration (AV) of 630 equivalents/$10^6$ g. Then, the polymer was depolymerized at 210° C. under 1 mmHg for 2 hours to obtain 35 g of lactide.

Comparative Example 8

One hundred grams of lactic acid solution (90%) and 0.28 g of tin 2-ethylhexanoate were placed in a four-neck flask equipped with a stirring device and a nitrogen introducing tube. The mixture was heated with stirring to 180° C. over 1 hour in a stream of nitrogen to be concentrated by dehydration. Then, the resultant mixture was gradually depressurized to 5 mmHg over 1 hour, and was subjected to stirring reaction at 180° C. under 5 mmHg for 6 hours, whereby a precursor polymer was obtained. The polymer thus obtained was a yellowish white solid and had a carboxyl group concentration (AV) of 482 equivalents/$10^6$ g. Then, the polymer was depolymerized at 110° C. under 1 mmHg for 2 hours to obtain 39 g of lactide.

EXAMPLE 27

One hundred grams of L-lactic acid solution (90%), 3.4 g of glycerine, and 0.10 g of antimony trioxide were placed in a four-neck flask equipped with a stirring device and a nitrogen introducing tube. The mixture was heated with stirring to 180° C. over 1 hour in a stream of nitrogen to be concentrated by dehydration. Then, the resultant mixture was gradually depressurized to 5 mmHg over 1 hour, and was maintained under these conditions for 4 hours, whereby a precursor polymer was obtained. The polymer thus obtained was a pale yellow transparent solid and had a carboxyl group concentration (AV) of 83 equivalents/$10^6$ g. Then, 0.1 g of titanium tetrabutoxide was added to the polymer, and the mixture was depolymerized at 210° C. under 1 mmHg for 30 minutes to obtain 65 g of lactide.

EXAMPLE 29

One hundred grams of L-lactic acid solution (90%), 3.4 g of glycerine, and 0.21 g of antimony trioxide were placed in a four-neck flask equipped with a stirring device and a nitrogen introducing tube. The mixture was heated with stirring to 180° C. over 1 hour under a slow stream of nitrogen to be concentrated by dehydration. Then, the resultant mixture was gradually depressurized to 5 mmHg over 1 hour, and was maintained under these conditions for 4 hours, whereby a precursor polymer was obtained. The polymer thus obtained was a pale yellow transparent solid and had a carboxyl group concentration (AV) of 50 equivalents/$10^6$ g. Then, 0.1 g of titanium tetrabutoxide was added to the polymer, and the mixture was depolymerized at 210° C under 1 mmHg for 30 minutes to obtain 65 g of lactide.

EXAMPLE 29

One hundred grams of L-lactic acid solution (90%), 3.4 g of glycerine, and 0.28 g of tin 2-ethylhexanoate were placed in a four-neck flask equipped with a stirring device and an inlet and outlet tube. The mixture was heated with stirring to 180° C. over 1 hour under a slow stream of nitrogen to be thickened by dehydration. Then, the resultant mixture was gradually depressurized to 5 mmHg over 1 hour, and was maintained under these conditions for 2 hours, whereby a precursor polymer was obtained. The polymer thus obtained was a yellowish white solid and had a carboxyl group concentration (AV) of 22 equivalents/$10^6$ g. Then, 0.1 g of titanium tetrabutoxide was added to the polymer, and the mixture was depolymerized at 210° C. under 1 mmHg for 30 minutes to obtain 62 g of lactide.

Comparative Example 9

One hundred grams of L-lactic acid solution (90%) and 0.10 g of antimony trioxide were placed into a four-neck flask equipped with a stirring device and a nitrogen introducing tube. The mixture was heated with stirring to 180° C. over 1 hour in a stream of nitrogen to be concentrated by dehydration. Then, the resultant mixture was gradually depressurized to 5 mmHg over 1 hour, and was maintained under these conditions for 2 hours, whereby a precursor polymer was obtained. The polymer thus obtained was a pale yellow transparent solid and had a carboxyl group concentration (AV) of 2655 equivalents/$10^6$ g. Then, the polymer was depolymerized at 210° C. under 1 mmHg for 2 hours to obtain 58 g of lactide. The results of the analysis of lactide obtained in Examples 24 to 29 and Comparative Examples 6 to 10 are shown in Table 2. The unit of AV is represented by equivalents/$10^6$ g, and the yield of lactide is based on lactic acid.

Comparative Example 10

Eighty-four grams of L-lactic acid solution (85 to 92%), 36.23 g (0.07 mol %) of polyethylene glycol (average molecular weight: 600), and 0.24 g of tin octylate were placed in a four-neck flask equipped with a stirring device and a nitrogen introducing tube. The mixture was heated with stirring to 180° C. over 1 hour under a slow stream of nitrogen to be concentrated by dehydration. Then, the resultant mixture was gradually depressurized to 20 mmHg over 1 hour, and was maintained under these conditions for 7 hours, whereby a precursor polymer was obtained. The polymer had a carboxyl group concentration (AV) of 561 equivalents/$10^6$ g. Then, the polymer was depolymerized at 200° C. under 0.05 mmHg for 1.5 hours to obtain a cyclic dimer (lactide). The AV and yield of the obtained cyclic dimer are shown in Table 2.

TABLE 2

|  | Precursor polymer | Yield of lactide | Lactide | Lactide composition (Weight %) | | |
|---|---|---|---|---|---|---|
|  | AV | (%) | AV | L,D form | Meso-form | Total |
| Example 24 | 64 | 89 | 175 | 88.4 | 4.4 | 92.8 |
| Example 25 | 118 | 86 | 161 | 85.6 | 5.8 | 91.4 |
| Example 26 | 60 | 86 | 91 | 85.3 | 6.8 | 92.1 |
| Example 27 | 83 | 90 | 117 | 86.9 | 6.9 | 93.8 |
| Example 28 | 50 | 90 | 131 | 84.8 | 7.8 | 92.6 |
| Example 29 | 22 | 86 | 73 | 83.9 | 9.3 | 93.2 |
| Comparable Example 6 | 516 | 53 | 724 | 83.7 | 6.4 | 90.1 |
| Comparable Example 7 | 630 | 49 | 839 | 80.9 | 11.4 | 92.3 |
| Comparable Example 8 | 482 | 54 | 697 | 82.5 | 10.0 | 92.5 |
| Comparable Example 9 | 2655 | 81 | 2937 | 71.4 | 7.3 | 78.7 |
| Comparable Example 10 | 561 | 72 | 706 | 81.0 | 10.1 | 91.1 |

Reference Example 1

Two hundred and fifty grams of L-lactic acid solution (90%) and 0.5 g of tin(I) octylate were placed in a four-neck flask equipped with a stirring device and a nitrogen introducing tube. The mixture was dehydrated and then condensed at 200° C. in an atmosphere of nitrogen to obtain a precursor polymer. The polymer thus obtained was decomposed at 205° C. under 0.3 mmHg to obtain a pale yellow crystal of lactide which was a cyclic diester. Lactide thus obtained had a carboxyl group concentration (AV) of 609 equivalents/$10^6$ g and a moisture content of 720 ppm.

EXAMPLE 30

Ten grams of lactide obtained in Reference Example 1 was washed with 20 ml of water by grinding in a mixer for 3 minutes. The resultant lactide was filtered and dried in a stream of nitrogen. The dried lactide was further dried under reduced pressure for 48 hours to obtain a white crystal. The recovery amount of lactide was 7.12 g which was 71% of the initial weight thereof. The lactide thus obtained had a carboxyl group concentration (AV) of 27 equivalents/$10^6$ g and a moisture content of 240 ppm.

Five grams of the lactide thus obtained was placed in a polymerizing vessel equipped with a stirring device and an inlet and outlet tube together with 1% toluene solution of 1.5 mg of tin(I) octanoate. The mixture was heated at 200° C. for 1 hour in an atmosphere of nitrogen to be ring opening polymerized. The polymer thus obtained had a high molecular weight and had a reduced specific viscosity ($\eta_{SP}$/C) (d-chloroform) of 2.09. The results are shown in Table 3.

EXAMPLE 31

Ten grams of lactide obtained in Reference Example 1 was washed with 20 ml of water/isopropanol (2/1 volume ratio) by grinding in a mixer for 3 minutes. The resultant lactide was filtered and dried in a stream of nitrogen. The dried lactide was further dried under reduced pressure for 48 hours to obtain a white crystal. The recovery amount of lactide was 6.45 g which was 65% of the initial weight thereof. The lactide thus obtained had a carboxyl group concentration (AV) of 6 equivalents/$10^6$ g and a moisture content of 190 ppm.

Five grams of the lactide thus obtained was ring opening polymerized in the same way as in Example 1. The polymer thus obtained had a high molecular weight and had a reduced specific viscosity ($\eta_{SP}$/C) (d-chloroform) of 2.22. The results are shown in Table 3.

Comparative Example 11

Five grams of lactide obtained in Reference Example 1 was ring opening polymerized in the same way as in Example 1, except that the lactide was not purified by washing with an aqueous solvent. The resultant polymer had a reduced specific viscosity ($\eta_{SP}$/C) (d-chloroform) of 0.20. The results are shown in Table 3.

Comparative Example 12

Twenty grams of lactide obtained in Reference Example 1 was recrystallized three times with 20 ml of isopropanol to obtain a white crystal. The recovery amount of the lactide was 11.62 g which was 58% of the initial weight thereof. The lactide thus obtained had a carboxyl group concentration (AV) of 13 and a moisture content of 150 ppm.

Five grams of lactide thus obtained was ring opening polymerized in the same way as in Example 1, except that the lactide was not purified by washing with an aqueous solvent. The resultant polymer had a reduced specific viscosity ($\eta_{SP}$/C) (d-chloroform) of 2.30. The results are shown in Table 3.

Reference Example 2

Two hundred and fifty grams of L-lactic acid solution and 0.3 of antimony trioxide were placed in a four-neck flask equipped with a stirring device and a nitrogen introducing tube. The mixture was dehydrated and then condensed at 200° C. in an atmosphere of nitrogen to obtain a precursor polymer. Then, 9.2 g of 1-dodecanol (1.5 equivalents of carboxyl group concentration (AV)) was added to 60 g of the polymer thus obtained and allowed to react at 200° C. for 30 minutes. The reaction mixture was depolymerized at 210° C. under 0.1 mmHg to obtain a pale yellow crystal of lactide which was a cyclic diester. The resultant lactide had a carboxyl group concentration (AV) of 4 and a moisture content of 150 ppm.

EXAMPLE 32

Ten grams of lactide obtained in Reference Example 2 was washed with 20 ml of water/isopropanol (2/1 volume ratio) by grinding in a mixer for 3 minutes. The resultant lactide was filtered and dried in a stream of nitrogen. The dried lactide was further dried under reduced pressure for 48 hours to obtain a white crystal. The recovery amount of lactide was 6.55 g which was 75% of the initial weight thereof. The lactide thus obtained had a carboxyl group concentration (AV) of 0 equivalent $10^6$ g and a moisture content of 160 ppm.

Five grams of the lactide thus obtained was ring opening polymerized in the same way as in Example 1. The polymer thus obtained had a high molecular weight and had a reduced specific viscosity ($\eta_{SP}/C$) (d-chloroform) of 2.74. The results are shown in Table 3.

Comparative Example 13

Five grams of lactide obtained in Reference Example 2 was ring opening polymerized in the same way as in Example 1, except that the lactide was not purified by washing with an aqueous solvent. The resultant polymer had a reduced specific viscosity ($\eta_{SP}/C$) (d-chloroform) of 2.01. The results are shown in Table 3.

Reference Example 3

Two hundred grams of glycolic acid (crystal) and 0.1 g of tin(I) acetate were placed in a four-neck flask equipped with a stirring device and a nitrogen introducing tube. The mixture was dehydrated at 180° C. in an atmosphere of nitrogen and then condensed at 235° C. to obtain a precursor polymer. The polymer thus obtained was depolymerized at 235° C. under 0.1 mHg to obtain a pale yellow crystal of glycolide which was a cyclic diester.

The glycollide thus obtained had a carboxyl group concentration (AV) of 748 and a moisture content of 750 ppm.

EXAMPLE 33

Ten grams of glycolide obtained in Reference Example 3 was washed with 20 ml of water by grinding in a mixer for 3 minutes. The resultant glycollide was filtrated and dried in a stream of nitrogen. The dried glycollide was further dried under reduced pressure in a desiccator for 50 hours to obtain a white crystal. The recovery amount of the refined product was 7.78 g which was 78% of the initial weight of the glycollide. The glycolide thus obtained had a carboxyl concentration (AV) of 20 equivalent $10^6$ g and a moisture content of 200 ppm.

Five grams of the glycolide thus obtained was placed in a polymerizing vessel equipped with a stirring device and an inlet and outlet tube together with 1% toluene solution of 1.5 mg of tin(I) octylate and heated at 200° C. for 1 hour in an atmosphere of nitrogen to be ring opening polymerized. The polymer thus obtained had a high molecular weight and had a reduced specific viscosity ($\eta_{SP}C$) (trichlorophenol/phenol) of 1.65. The results are shown in Table 3.

Comparative Example 4

Five grams of glycolide obtained in Reference Example 3 was ring opening polymerized in the same way as in Example 4, except that the glycolide was not purified by washing with an aqueous solvent. The resultant polymer had a reduced specific viscosity ($\eta_{SP}/C$) (trichlorophenol/phenol) of 0.05. The results are shown in Table 3.

Comparative Example 15

Twenty grams of glycolide obtained in Reference Example 3 was recrystallized three times with 20 ml of ethyl acetate to obtain a white crystal. The recovery amount of the refined product was 13.82 g which was 69% of the initial weight of the glycollide. The glycolide thus obtained had a carboxyl concentration (AV) of 7 and a moisture content of 120 ppm.

Five grams of glycollide thus obtained was ring opening polymerized in the same way as in Example 4, except that 5 g of glycolide was not purified by washing with an aqueous solvent. The resultant polymer had a reduced specific viscosity ($\eta_{SP}/C$) (trichlorophenol/phenol) of 1.73. The results are shown in Table 3.

TABLE 3

|  | Solvent for washing | Recovery ratio of purified product | AV | Moisture content | Viscosity |
|---|---|---|---|---|---|
| Reference Example 1 | — | Lactide | 609 | 720 | 0.20 |
| Example 30 | Water | 71 | 27 | 240 | 2.09 |
| Example 31 | Water/isopropanol | 65 | 6 | 190 | 2.22 |
| Comparative Example 11 | — | — | 609 | 720 | 0.20 |
| Comparative Example 12 | Recrystallized (isopropanol) | 58 | 13 | 150 | 2.30 |
| Reference Example 2 | — | Lactide | 4 | 150 | 2.01 |
| Example 32 | Water/isopropanol | 66 | 0 | 160 | 2.74 |
| Comparative Example 13 | — | — | 4 | 150 | 2.01 |
| Reference Example 3 | — | Glycollide | 748 | 750 | 0.05 |
| Example 33 | Water | 78 | 20 | 200 | 1.65 |
| Comparative Example 14 | — | — | 748 | 750 | 0.05 |
| Comparative Example 15 | Recrystallized (Ethyl acetate) | 69 | 7 | 120 | 1.73 |

As is apparent from the above-mentioned examples, the polylactic acid and/or its copolymer with its terminus blocked are excellent in melt stability and hydrolysis resistance, and exhibit satisfactory biodegrability. Furthermore, a method according to the present invention provides cyclic diesters (lactides) with higher purity compared with conventional methods. The method according to the present invention is relatively simple since it does not require a complicated purification procedure. Thus, the method according to the present invention is very important for reducing costs of a polymer and is industrially significant.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polymer having a blocked terminal group, represented by the following Formula (I):

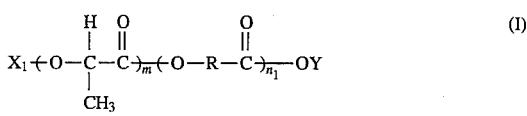

wherein R is an alkylene group containing 1 to 20 carbon atoms; $X_1$ is an acyl group containing 2 to 50 carbon atoms; Y is H, an alkyl group containing 1 to 50 carbon atoms or an alkenyl group containing 1 to 50 carbon atoms; m is a positive integer; and $n_1$ is 0.

2. A polymer having a blocked terminal group, wherein the polymer is produced by using an aluminum compound as a catalyst thereby exhibiting satisfactory melt stability, and represented by the following Formula (II):

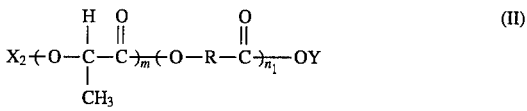

wherein R is an alkylene group containing 1 to 20 carbon atoms; $X_2$ is H or an acyl group containing 2 to 50 carbon atoms; Y is H, an alkyl group containing 1 to 50 carbon atoms or an alkenyl group containing 1 to 50 carbon atoms; m is a positive integer; and $n_1$ is 0 or a positive integer; wherein both $X_2$ and Y are not H, wherein, in a case where $X_2$ is H, the polymer has the following properties (a), (b), and (c):

(a) $IVf/IVi \geq 0.85$ where IVf and IVi respectively represent reduced viscosity of the polymer after and before the polymer is melted in an atmosphere of an inert gas at 200° C. for about one hour;

(b) $T_{10\%}$ (°C.) $\geq 300$ where $T_{10\%}$ represents a temperature at which 10% by weight of the polymer based on an initial weight thereof is reduced in a thermogravimetric analysis in which the polymer is heated at 10° C./minute in a stream of an inert gas; and (c) $1.00 \geq A/(A+B) \geq 0.95$ where A represents total absorption strength of the polymer in $^1$H-NMR, and B represents total absorption strength of monomers in $^1$H-NMR.

3. A block polymer of lactic acid having a blocked terminal group and represented by the following Formula (III):

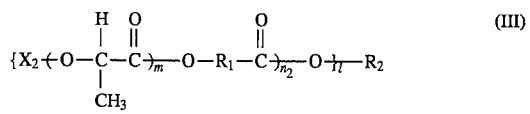

where $R_1$ is an aliphatic hydrocarbon group with 1 to 50 carbon atoms; $R_2$ is an aliphatic hydrocarbon group with 2 to 20 carbon atoms; $X_2$ is H or an acyl group with 2 to 50 carbon atoms; 1 is an integer of not less than one; m is a positive integer; and $n_2$ is a positive integer.

4. A polymer according to claim 3, having a melting point of not less than 120° C., wherein m and $n_2$ satisfy the following Formula (IV):

$$0.6 \geq \frac{n_2}{m+n_2} \geq 1 \times 10^{-3} \qquad (IV)$$

5. A polymer according to claim 1, wherein a weight of a polymer component having a number average molecular weight of about 70 to about 1000 is not more than 2% based on a total weight of the polymer.

6. A polymer according to claim 2, wherein a weight of a polymer component having a number average molecular weight of about 70 to about 1000 is not more than 2% based on a total weight of the polymer.

7. A polymer according to claim 3, wherein a weight of a polymer component having a number average molecular weight of about 70 to about 1000 is not more than 2% based on a total weight of the polymer.

8. A polymer according to claim 4, wherein a weight of a polymer component having a number average molecular weight of about 70 to about 1000 is not more than 2% based on a total weight of the polymer.

9. A method for producing a polymer of claim 1, comprising the step of: ring opening polymerizing lactone in the presence of an aliphatic carboxylic acid containing 2 to 50 carbon atoms, wherein an amount of the aliphatic carboxylic acid is in the range of 0.001 to 5 mol % based on an amount of lactone.

10. A method for producing a polymer of claim 2, comprising the step of: ring opening polymerizing lactone in the presence of an aliphatic carboxylic acid containing 2 to 50 carbon atoms, wherein an amount of the aliphatic carboxylic acid is in the range of 0,001 to 5 mol % based on an amount of lactone.

11. A method for producing a polymer of claim 3, comprising the step of: ring opening polymerizing lactone in the presence of an aliphatic carboxylic acid containing 2 to 50 carbon atoms, wherein an amount of the aliphatic carboxylic acid is in the range of 0.001 to 5 mol % based on an amount of lactone.

12. A method for producing a polymer of claim 4, comprising the step of: ring opening polymerizing lactone in the presence of an aliphatic carboxylic acid containing 2 to 50 carbon atoms, wherein an amount of the aliphatic carboxylic acid is in the range of 0.001 to 5 mol % based on an amount of lactone.

13. A method for producing a polymer of claim 1, comprising ring opening polymerizing lactone in the presence of a saturated or unsaturated aliphatic alcohol containing 1 to 50 carbon atoms, wherein an amount of the aliphatic alcohol is in the range of about 0.001 to about 5 mol % based on the amount of lactone.

14. A method for producing a polymer of claim 2, comprising ring opening polymerizing lactone in the presence of a saturated or unsaturated aliphatic alcohol containing 1 to 50 carbon atoms, wherein an amount of the aliphatic alcohol is in the range of about 0.001 to about 5 mol % based on the amount of lactone.

15. A method for producing a polymer of claim 3, comprising ring opening polymerizing lactone in the presence of a saturated or unsaturated aliphatic alcohol containing 1 to 50 carbon atoms, wherein an amount of the aliphatic alcohol is in the range of about 0.001 to about 5 mol % based on the amount of lactone.

16. A method for producing a polymer of claim 4, comprising ring opening polymerizing lactone in the presence of a saturated or unsaturated aliphatic alcohol containing 1 to 50 carbon atoms, wherein an amount of the aliphatic alcohol is in the range of about 0.001 to about 5 mol % based on the amount of lactone.

17. A method according to claim 9, wherein a catalyst containing tin is used.

18. A polymer according to claim 2, wherein the aluminum compound has the structure

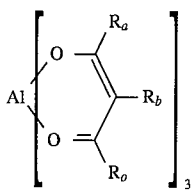

wherein $R_a$ and $R_b$ are independently an alkyl group, a cycloalkyl group, or an aryl group; $R_o$ is H, an alkyl group, a cycloalkyl group, or an aryl group; and the alkyl group, cycloalkyl group, or aryl group may contain a substituted halogen.

19. A polymer according to claim 2, wherein the aluminum compound comprises a saturated or unsaturated carboxylic acid aluminum salt.

* * * * *

UNITED STATES PATENT AND TRADEMARK OFFICE
CERTIFICATE OF CORRECTION

PATENT NO. : 5,618,911
DATED : April 8, 1997
INVENTOR(S) : KIMURA et al.

It is certified that error appears in the above-identified patent and that said Letters Patent is hereby corrected as shown below:

Column 3, line 8, the formula "(c) $1.00 \geq A/(\underline{a}+B) \geq 0.95$" should be --(c) $1.00 \geq A/(\underline{A}+B) \geq 0.95$--.

Column 7, line 3, the word "$\underline{a}$ctylate" should be --$\underline{o}$ctylate--.

Column 24, line 37, the word "glyco$\underline{ll}$ide" should be --glyco$\underline{l}$ide--.

Claim 1, col. 25, line 30, "$n_1$ is 0" should be --$n_1$ is 0 or a positive integer--

Signed and Sealed this

Tenth Day of March, 1998

Attest:

BRUCE LEHMAN

*Attesting Officer*    *Commissioner of Patents and Trademarks*